Nov. 19, 1935.  F. S. CARLILE  2,021,288

BATTERY

Filed April 6, 1934

INVENTOR
Frank S. Carlile
BY
Symnestvedt + Lechner
ATTORNEYS

Patented Nov. 19, 1935

2,021,288

UNITED STATES PATENT OFFICE 2,021,288

BATTERY

Frank S. Carlile, Abington, Pa., assignor to Carlile & Doughty, Incorporated, a corporation of Pennsylvania Application April 6, 1934, Serial No. 719,291

10 Claims. (Cl. 136—177)

This invention relates to a construction for storage batteries, and is particularly useful for batteries which are used in positions where the space available is limited or obstructed or where it is awkward to get access to the top of the battery. The conditions of use and position of batteries on motorcycles is an example.

One of the primary objects of my invention is the provision of such a storage battery which may be easily filled or refilled with electrolyte or water.

A further object is the provision of a battery with filling openings which are readily accessible when the space above the top of the battery is limited or obstructed.

Another object is the provision of a battery which has a large tolerance of operation from the horizontal, i. e., a battery which, while provided with conveniently located filling openings in accordance with the preceding object, can be tipped over to a considerable degree without danger of leakage or spilling of electrolyte through said openings, even if, through carelessness or accident, they be not tightly sealed.

A further object is the provision, in a battery of the character referred to, of means for excluding dirt, dust and oil while at the same time adequate provision for venting the battery is made.

A further object is the provision, in a battery of the character referred to, of an arrangement for protecting the plugs for filling openings from accidental blows and abuse.

A further object is the provision, in a battery having a plurality of filling openings for each cell, of means for insuring that the proper plug is used for each opening.

These, together with such other objects as may appear hereinafter or are incident to my invention, I have illustrated in preferred form in the accompanying drawing, wherein—

Figure 5:
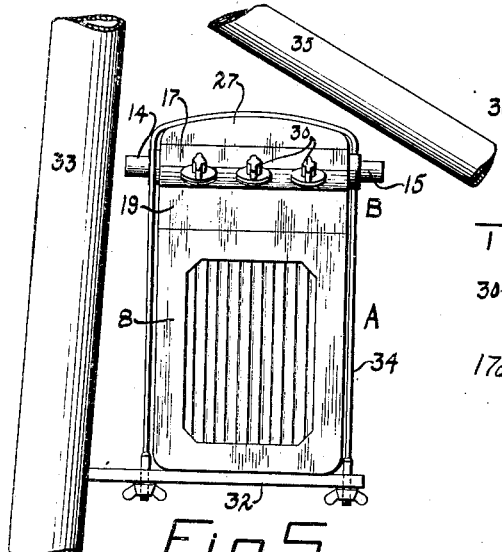
Figure 5 is an end elevation of the battery showing its position with relation to certain of the parts of a motorcycle when mounted for use thereon.
Figure 3:
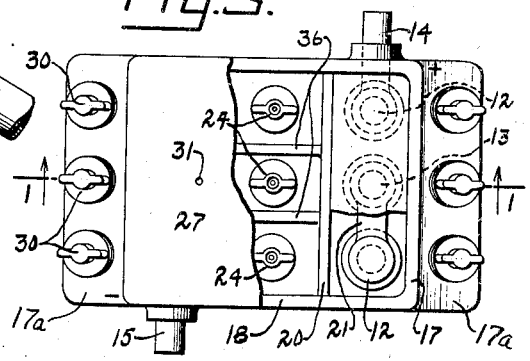
Figure 3 is a plan view with portions of the cover and the lid broken away.
Figure 2:
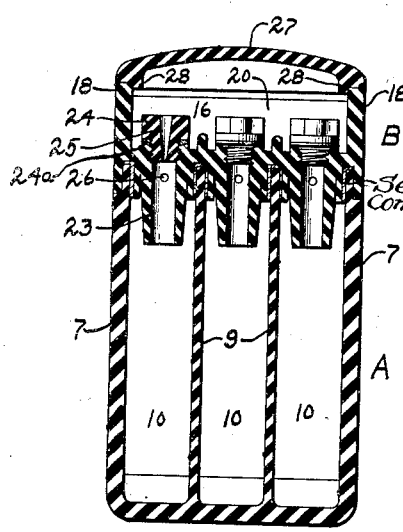
Figure 2 is a section taken on the line 2—2 of Figure 1.
Figure 1:
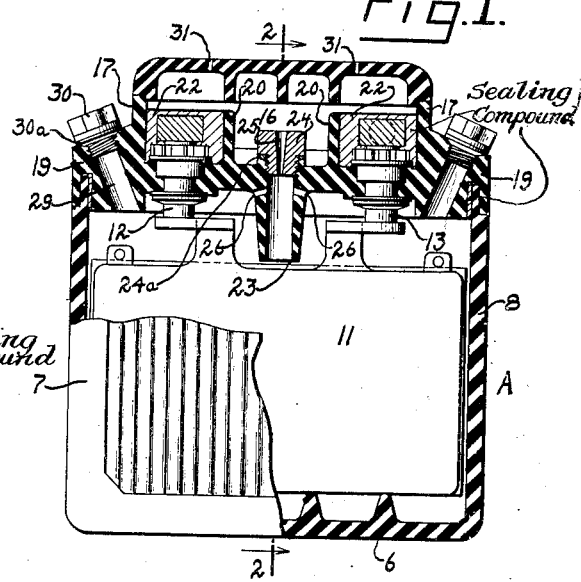
Figure 1 is a longitudinal sectional view taken on the line 1—1 of Figure 3, with a portion shown in elevation.
Figure 4:
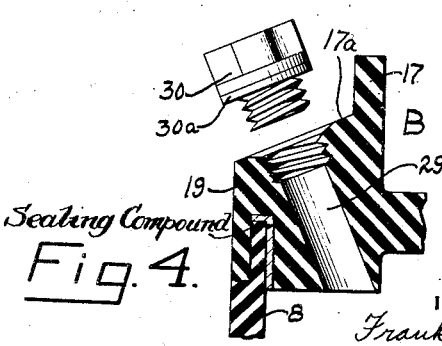
Figure 4 is an enlarged sectional view of an end of the cover showing a filling opening and plug therefor.

The battery illustrated consists of a container A having bottom 6, side walls 7, end walls 8 and longitudinal partitions 9 dividing the container into three battery cells 10. The container A is provided with a one piece cover B which is adapted to fit snugly onto the container. The under face of the cover is provided with an annular groove into which the upper edge of the end and side walls of the container fit and there are similar longitudinal grooves into which the upper edges of the partitions 9 extend.

An appropriate sealing and cementing compound is used in the grooves to secure the cover B to the container A and to prevent leakage at the joints between the cover and the container as well as between the cover and the longitudinal walls 9.

The plates 11 for the respective cells are fused or "lead burned" to positive and negative posts 12 and 13, respectively, which in turn extend through openings in the cover B. These posts 12 and 13 are connected together by links 21 in the usual manner with exteriorly projecting positive and negative terminals 14 and 15, respectively, connected to the appropriate post of the outer cells.

The upper side of the cover is recessed to form a chamber 16 into which the upper ends of the posts project and the depth of this chamber is further increased by the provision of upstanding walls 17 and 18. The walls 18 at the side constitute an extension of the side face of the cover but the end walls 17 are stepped back from the end faces 19 of the cover so that the chamber 16 is centrally located intermediate the ends 19 of the cover, there being an inclined shoulder 17a between the end walls 17 and the end faces 19.

The chamber 16 is divided into three compartments by the transverse ribs 20. The posts 12 and 13 extend into the end compartments thus formed and, when the battery is assembled a sealing compound 22 is poured into the two end compartments, completely embedding the links 21 and upper ends of the posts 12 and 13.

In order to fill the cells of the battery, I provide in the central compartment of the cover, a filling opening for each cell, and on the under face of the cover surrounding said openings, I provide tubular extensions or spouts 23 which extend downwardly with their lower ends in close proximity to the upper edges of the plates 11 and also to the normal surface of the electrolyte in the cells.

The filling openings are screw threaded and appropriate screw threaded plugs 24 with rubber gaskets 24a and vents 25 are provided to close the openings. The spouts 23 also have vents 26 near the upper ends thereof. A pair of longitudinally extending ribs 36 cooperate with the transverse ribs 20 to form individual pockets or wells around each plug 24 and the opening which it closes so as to prevent the formation of a continuous body of electrolyte across the three vent openings which might otherwise exist should there be a slight leakage from any cell due to jolting, loose plugs, or the like. This avoids shorting and ultimate discharge of the battery.

A flanged lid 27 fits over the chamber 16, the flanges 28 engaging the walls 17 and 18 to secure the lid in position. Vents 31 are provided in this lid 27.

Through at least one end shoulder 17a of the cover, I provide for each cell, an additional filling opening or passage 29 which opening, as shown, slants inwardly so that its lower end is spaced substantially from the battery end wall. If desired for the sake of convenience an additional opening 29 may be provided at each end of each cell as shown although this is not essential to the attainment of the principal objects of the invention. In some installations, however, this is a very helpful provision because of the fact that access to one end or the other of the battery may be awkward or impossible due to adjacent parts and reversal of the battery is not always an easy matter because of the relative arrangement of the positive and negative terminals.

The upper ends of such passages 29 are screw threaded to receive the screw threaded plugs 30 which close the openings, there being rubber gaskets 30a under the plug heads in order to effect a tight seal. The screw threaded plugs 30, however, have no vents, and form air and dust-tight closures. The plugs 30 are also of such size that they will not fit the screw threaded filling openings in the central compartment of chamber 16, and the plugs 24 for such latter filling openings are also of such size that they will not fit the openings 29. The plugs 24 and 30 are, therefore, not interchangeable and, if simultaneously removed, it will be impossible to replace them on the wrong opening.

In Figure 5, the battery is shown mounted on a stand 32 secured to an upright strut 33 of a motorcycle. A strap 34 holds the battery to the stand and also holds the lid member 27 in place. The relative location of another strut 35 of the motorcycle is also shown and it will be seen that the top of the battery is in such close proximity to the top strut 35 that it will be difficult and awkward to remove the lid 27 and to get access to the filling openings to replenish the battery with water or to insert testing instruments into the electrolyte.

The relative location of the struts 33 and 35 to the battery is that which is found in a well known motorcycle. In other types, while the location may be somewhat different, it will be found that similar space limitations and problems will be met, and in all motorcycles, it is well known that the battery is subject to exposure to dirt, dust, grime and oil which should be excluded from the cells of the battery.

By reason of the provision of filling openings 29 adjacent an end of the battery, it will be seen that water may be easily and conveniently supplied to the cells, without removing the lid 27, to get access to the opening in chamber 16.

As the plugs 30 for the openings are imperforate, it will be impossible for dirt, oil or any foreign matter to enter the cells of the battery therethrough as would be the case if the plugs had vents. The fact that these plugs 30 are not vented and also because the lower ends of the openings 29 are spaced inwardly from the end wall of the battery makes it possible to tilt the battery from the horizontal to a substantial degree, without loss of electrolyte even if the plugs 30 do not happen to be screwed in quite tightly, and this is an important feature when the batteries are used on motorcycles which are frequently leaned against buildings or curbs at a considerable angle from the vertical.

It is of course necessary to vent the cells of the battery to provide for the escape of gas generated when the battery is being charged, and for this reason the plugs 24 are vented. The vents 25 in these plugs 24, however, are protected from dirt, oil and foreign matter by the lid 27 which is likewise vented to permit escape of the gas from chamber 16. Since the vents 25 are near the center of the cells, it will also require a much greater tilt to the battery to spill electrolyte therethrough than would be the case if the vents were provided in plugs 30 at the end of the battery.

It is of course important that when the plugs 30 and 24 are removed that they be returned to their proper openings. If, for example, two imperforate plugs were placed on the two openings for one cell, the cell would be gas tight and the gases generated in charging the battery would cause it to explode. Again, if a vented plug were placed on one of the openings 29, dirt and foreign matter could easily enter the battery and the electrolyte would be more easily spilled. For such reasons, I have made it impossible to replace the plugs improperly, by making plugs 24 and 30 of different diameter so that they will not fit the wrong opening and are not interchangeable.

From the foregoing, it will be seen that I have provided a battery, the cells of which may be easily replenished with water, or filled, even though space limitations make access to the top of the battery awkward or difficult. My improved battery is also protected from dust, dirt and other foreign matter, and can be tilted from the horizontal to a large degree, without spilling of the electrolyte. Exposed plugs 30 are also protected from accidental blows by reason of the fact that they lie inside the plane of the top and ends of the battery, and are thus less liable to be broken or damaged. The provision of the lid 27, in addition to its protective feature, also affords an easy means for firmly securing the battery in position as by means of the straps 34 or other suitable clamping or holding device. The lid presses down on the whole battery assembly (cover and jar) and holds the parts in their proper relative positions against the effects of jarring which is often severe in motorcycles.

I claim:—

1. In a storage battery, a cover having a central chamber, a filling opening through said cover in the said chamber, a vented lid for said chamber, a filling opening through said cover adjacent an end thereof and outside of the said chamber, an imperforate plug for said latter opening, and a perforated plug for said first opening, the plug outside of the chamber when in position lying substantially inside the vertical plane of the end of the cover as well as below the plane of the top of said lid.

2. A storage battery cover for a battery having a plurality of cells, said cover having a chamber intermediate the ends thereof, filling openings through said cover in the said chamber for the cells of the battery, perforated plugs for said openings, a vented lid for said chamber, filling openings through said cover adjacent an end thereof and outside of said chamber, imperforate plugs for said latter openings, the latter plugs when in position lying substantially inside the vertical plane of the end of the cover and also below the plane of the top of said lid.

3. In a storage battery, a plurality of cells, a cover for said cells, a filling opening for each cell in the central portion of said cover, a second filling opening for each cell adjacent an end of said cover, perforate plugs for said first openings, imperforate plugs for said second openings, and a protecting lid extending over said perforated plugs but not over said imperforate plugs, said imperforate plugs lying below the plane of the top of said lid and inside the vertical plane of the said adjacent end of the cover.

4. In a storage battery, a plurality of cells, a cover therefor having an end thereof inclined outwardly and downwardly to provide an inclined shoulder, a filling opening for each cell extending inwardly and downwardly through said shoulder, a second filling opening for each cell through the central portion of said cover, imperforate plugs for said first openings, perforate plugs for said second openings, and a protecting lid extending over said perforated plugs but not over said imperforate plugs.

5. In a storage battery, a plurality of cells, a cover therefor having an end thereof inclined outwardly and downwardly to provide an inclined shoulder, a filling opening for each cell extending inwardly and downwardly through said shoulder, a second filling opening for each cell through the central portion of said cover, imperforate plugs for said first openings, perforate plugs for said second openings, and a protecting lid extending over said perforated plugs but not over said imperforate plugs, the tops of said imperforate plugs lying below the plane of the top of the lid.

6. In a storage battery, a plurality of cells, a cover therefor having an end thereof inclined outwardly and downwardly to provide an inclined shoulder, a filling opening for each cell extending inwardly and downwardly through said shoulder, a second filling opening for each cell through the central portion of said cover, imperforate plugs for said first openings, perforate plugs for said second openings, and a protecting lid extending over said perforated plugs but not over said imperforate plugs, the perforate and imperforate plugs being non-interchangeable.

7. In a storage battery, a plurality of cells, a cover therefor having an end thereof inclined outwardly and downwardly to provide an inclined shoulder, a filling opening for each cell extending inwardly and downwardly through said shoulder, a second filling opening for each cell through the central portion of said cover, imperforate plugs for said first openings, perforate plugs for said second openings, and a protecting lid extending over said perforated plugs but not over said imperforate plugs, the perforate and imperforate plugs being non-interchangeable, and the tops of said imperforate plugs lying below the plane of the top of the lid.

8. In a storage battery, a plurality of cells, a cover therefor having an end thereof stepped down to provide a shoulder, a filling opening for each cell extending downwardly through said shoulder, a second filling opening for each cell through the central portion of said cover, imperforate plugs for said first openings, perforate plugs for said second openings, and a protecting lid extending over said perforated plugs but not over said imperforate plugs.

9. In a storage battery, a plurality of cells, a cover therefor having an end thereof stepped down to provide a shoulder, a filling opening for each cell extending downwardly through said shoulder, a second filling opening for each cell through the central portion of said cover, imperforate plugs for said first openings, perforate plugs for said second openings, and a protecting lid extending over said perforated plugs but not over said imperforate plugs, the perforate and imperforate plugs being non-interchangeable.

10. In a storage battery, a plurality of cells, a cover therefor having an end thereof stepped down to provide a shoulder, a filling opening for each cell extending downwardly through said shoulder, a second filling opening for each cell through the central portion of said cover, imperforate plugs for said first openings, perforate plugs for said second openings and a protecting lid extending over said perforated plugs but not over said imperforate plugs, the tops of said imperforate plugs lying below the plane of the top of the lid.

FRANK S. CARLILE.